United States Patent [19]
Stearns
[11] Patent Number: 4,896,174
[45] Date of Patent: Jan. 23, 1990

[54] TRANSPORT OF SUSPENDED CHARGED PARTICLES USING TRAVELING ELECTROSTATIC SURFACE WAVES

[75] Inventor: Richard G. Stearns, Mountain View, Calif.
[73] Assignee: Xerox Corporation, Stamford, Conn.

[21] Appl. No.: 326,135
[22] Filed: Mar. 20, 1989
[51] Int. Cl.$^4$ .......... G01D 15/00
[52] U.S. Cl. .......... 346/459; 346/155
[58] Field of Search .......... 346/155, 159, 154; 358/300; 400/119; 250/423 R

[56] References Cited

U.S. PATENT DOCUMENTS 4,538,163 8/1985 Sheridon .......... 346/159
4,644,373 2/1987 Sheridon .......... 346/154

Primary Examiner—Arthur G. Evans
Attorney, Agent, or Firm—Serge Abend

[57] ABSTRACT

A method and apparatus for transporting electrically charged particles suspended in a fluid, such as ions or the like, through said fluid, in a transport direction by means of a traveling electrostatic surface wave. The apparatus includes an array of transport electrodes to which a source of AC multi-phase potential is applied to create a stable and controllable particle transport system in which the charged particles have a compound motion comprising a generally cyclical movement and drift movement through the fluid, in the transport direction. The locus of charged particle movement is maintained above the surface of the electrode array.

6 Claims, 8 Drawing Sheets

TRANSPORT OF SUSPENDED CHARGED PARTICLES USING TRAVELING ELECTROSTATIC SURFACE WAVES

FIELD OF THE INVENTION

This invention relates to a system for directing the movement of ions or other charged particles, suspended in a fluid, by means of a traveling electrostatic surface wave and, more particularly, to a stable and controllable particle transport system in which the charged particles undergo a drift movement through the fluid in the direction of the electrostatic traveling wave.

BACKGROUND OF THE INVENTION

There are numerous practical applications for moving charged particles suspended in a fluid. For example, in the field of ionography it is desirable to move ions suspended in an air fluid in a controlled manner so as to transport them past an array of modulation electrodes and onto a charge receptor surface for being made visible by a development system. In another example, a liquid development fluid containing charged marking particles suspended in a solvent fluid is moved past a charge image for making it visible.

Ionography, as presently practiced, is described in U.S. Pat. No. 4,644,373 to Sheridon et al. It requires the generation of air ions in the generation chamber of a marking head, and their subsequent movement out of the chamber, through a modulation region and their final collection upon the surface of an external charge receptor. Movement of the ions through the head is effected by moving the fluid, i.e. air, by means of a blower. The ions ejected from the head are collected upon the receptor in a desired image pattern are then developed by attracting a suitable marking material, either a powder or a liquid, to the charge image. In order to be able to attract the marking material, the ion current or ion throughput must be high enough to build up charge images of sufficient magnitude upon the receptor surface. This relies heavily on the air flow rate through the marking head.

While air flow transport of ions has been found to be quite effective, it has several drawbacks. Relatively large blowers are required to supply the needed air flow, because of large pressure losses through the system, and complex filtering arrangements are required to prevent various sorts of airborne contaminants from reaching the corona environment. Also, in order to increase the printing speed, it would be necessary to provide higher ion current output (ion throughput), requiring more air flow, which will exacerbate any nascent problems. For example, larger, noisier, more expensive air pumps may generate turbulence in the modulation tunnel which may produce difficulties in the operation of the marking head. Similarly, when moving a liquid developer through a development system great care must be taken to avoid fluid flow speeds and other conditions which will create turbulence.

It would be highly desirable to move charged particles suspended in a fluid, through the fluid, due to their electrical mobility, without requiring movement of the fluid. As used herein, electrical mobility, which will be referred to simply as mobility, describes the macroscopic motion of the charged particle in the fluid, in the presence of an external electrical field. The charged particle, such as an ion or other small particle moves with microscopic near-random motion in the suspension fluid, which is made up of particles virtually the same size as the charged particle. The macroscopic motion of the charged particle in the fluid, as will be discussed below, is associated with that particle's mobility.

Therefore, it is the primary object of this invention to provide a stable transport system wherein particle movement through a fluid is based on the particle's electrical mobility, and wherein a traveling electrostatic wave causes a drift movement of the particles through the fluid in the direction of propagation of the electrostatic traveling wave.

SUMMARY OF THE INVENTION

The present invention may be carried out, in one form, by providing apparatus for transporting electrically charged particles suspended in a fluid through the fluid in a transport direction. The apparatus includes an array of electrically conductive transport electrodes, including a plurality of substantially parallel electrodes extending transversely to the transport direction, disposed upon a dielectric surface adjacent the fluid. A source of A.C. voltage is applied to each of the transport electrodes, the phases of neighboring electrodes being shifted with respect to each other so as to create a traveling electrostatic wave propagating in the transport direction. The electrical fields emanating from the transport electrodes are controlled so as to cause the charged particles to move in a generally cyclical path with a drift in the transport direction. The locus of charged particle movement is maintained above the surface of the electrode array.

BRIEF DESCRIPTION OF THE DRAWINGS

Other objects and further features and advantages of this invention will be apparent from the following, more particular, description considered with the accompanying drawings, wherein.

DETAILED DESCRIPTION OF THE INVENTION

Figure 1:
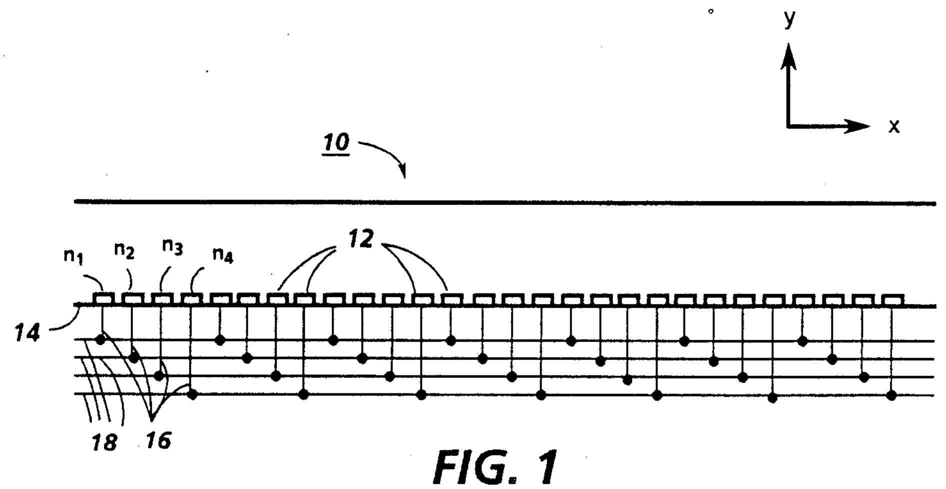
FIG. 1 is a side elevation view showing a channel through which charged particles may be transported through a fluid.

In the present invention charged particle transport is affected by means of an electrostatic surface wave, i.e., a wave of electric potential, propagating along the surface of a dielectric. In FIG. 1 there is shown a tunnel 10 within which a fluid, having charged particles suspended therein, is disposed. The tunnel merely serves to confine the fluid and is not necessary for practicing this invention. In fact, in its simplest form all that is needed is an array of transport electrodes 12 supported upon the upper surface of a dielectric substrate 14 and extending parallel to one another into the plane of the drawing. Each transport electrode is connected to a cyclically varying source of electrical potential via address lines 16 connected to bus lines 18 so that four adjacent transport electrodes driven in quadrature.

Figure 2:
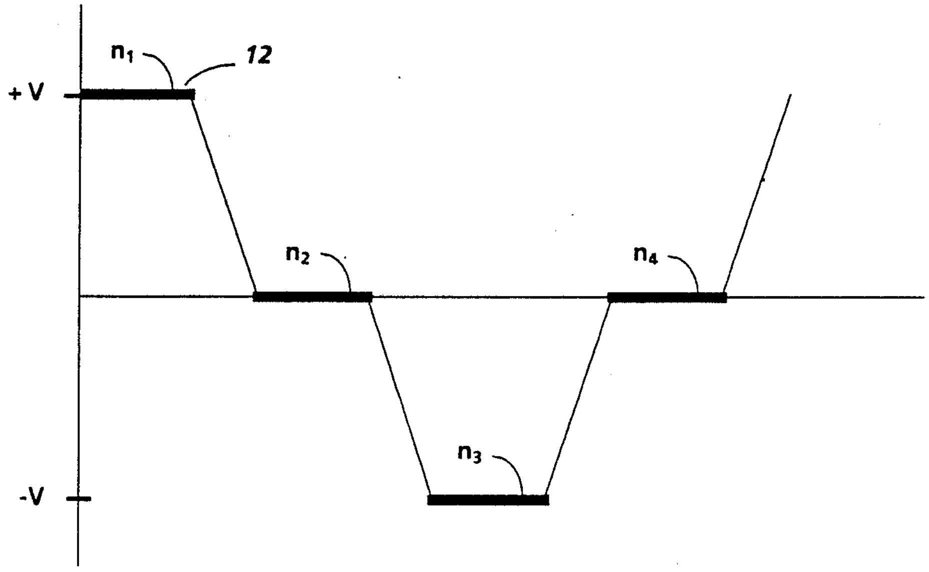
FIG. 2 is a graphical representation of the electrical potential on each of four transport electrodes driven in quadrature at a point in time.
Figure 3:
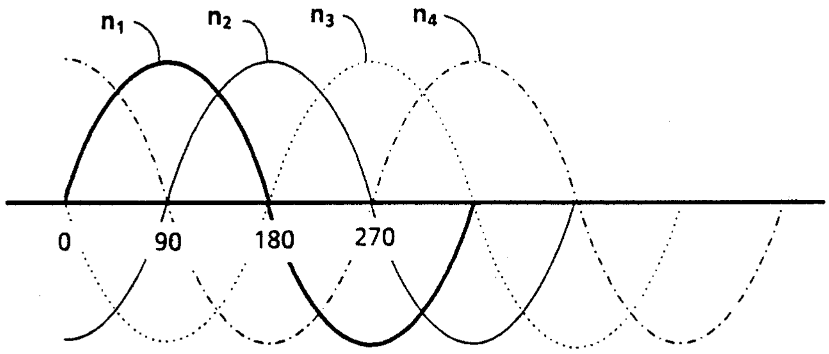
FIG. 3 is another graphical representation of the cyclical electrical potential applied to each of the transport electrodes driven in quadrature.

As can be seen in FIG. 2, the instantaneous value of the potential applied to four adjacent transport electrodes 12 ($n_1$, $n_2$, $n_3$, $n_4$) is 90° out of phase with its neighbors. This phase relationship may also be observed in FIG. 3, where the cyclical potential excursion on electrodes $n_1$ to $n_4$ is represented as a sine wave. In this manner, a traveling sine wave propagates in the +x, or transport, direction. Of course, it is possible to separate the transport electrodes by any practical phase shift, such as 45°, wherein eight electrodes would define one cycle of the electrostatic wave.

The particle transporting traveling sine wave may be constructed in other ways so that at a given region on the surface of the substrate 14 the voltage will rise and fall, out of phase with an adjacent region where the voltage will also rise and fall. This may be accomplished, for example, by using a piezoelectric material as the dielectric substrate (e.g., quartz or lithium niobate) and propagating an acoustic wave relative to the piezoelectric to produce a traveling electrostatic wave above the dielectric surface.

The electromotive force, for moving the charged particles through their suspension fluid above the surface of the transport electrodes in a drift direction parallel to the wave propagation direction, is derived from the changing electric field established between adjacent electrodes. This may be seen in FIGS. **4*a* to 4*d***, wherein the sine wave represents the traveling electrostatic wave, and the phantom lines extending from the region (electrode) of high potential (+V) to the adjacent regions (electrodes) of low potential (−V) represent field lines. In a mobility constrained system the charged particle is extremely small, is comparable in size to the fluid particles in which it is suspended, and carries very little net momentum, compared to the microscopic thermal momentum of the fluid particles. The fluid particles as well as the charged particles move rapidly on a microscopic scale, due to thermal motion. The charged particles collide regularly with the other particles in the system, losing memory of their velocity with each collision, and bouncing off with a random velocity after such collisions. When no external electric field is present, the charged particles exhibit no net motion over many collisions. When there is an electric field present, however, the charged particles gain a small amount of extra momentum during the intervals between collisions, in the direction of the field. Hence over many collisions, the charged particles move with a net velocity along the electric field lines. This net motion (i.e. averaged over many collisions) corresponds to a velocity much smaller than the thermal velocity of the particles between collisions. Because the collisions between particles occur so rapidly (approximately one collision per $10^{-10}$ seconds, in air), it follows that in any applications described herein, only the net velocity of the charged particle, averaged over many collisions, is of significance. This net velocity may be considered to be the macroscopic instantaneous velocity of the charged particle. At each moment of time, this instantaneous velocity will be directly proportional to the local electric field so that its previous velocity, or history, is inconsequential. The macroscopic velocity of the charge particle is defined by the equations:

$$V_x=\mu E_x, \text{ and} \quad (1)$$

$$V_y=\mu E_y, \quad (2)$$

where x is the direction in which the surface wave propagates along the substrate and y is the direction normal to the surface of the substrate. The instantaneous velocity of the ion above the surface can be seen to be proportional to the electric field E, where the proportionality factor is the ion mobility $\mu$.

Figure 4A:
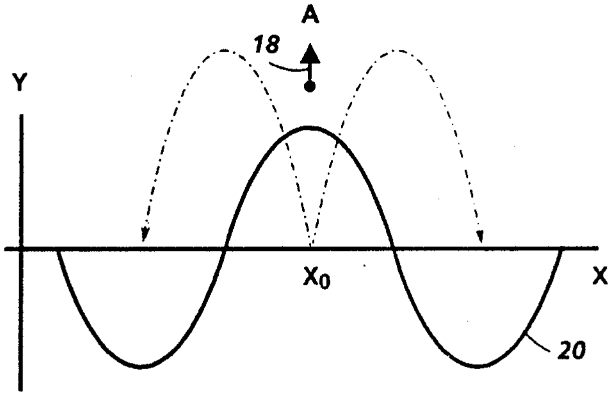
FIGS. 4*a* to 4*d* show the instantaneous motion of a mobility driven charged particle in the changing electric field.
Figure 4B:
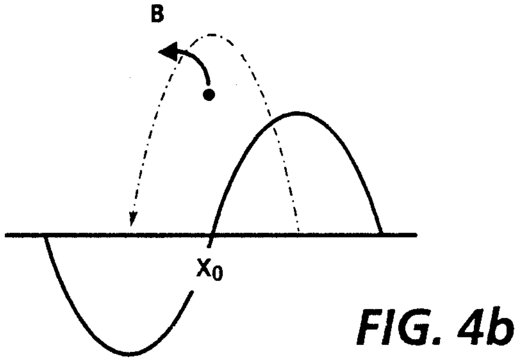
Figure 4C:
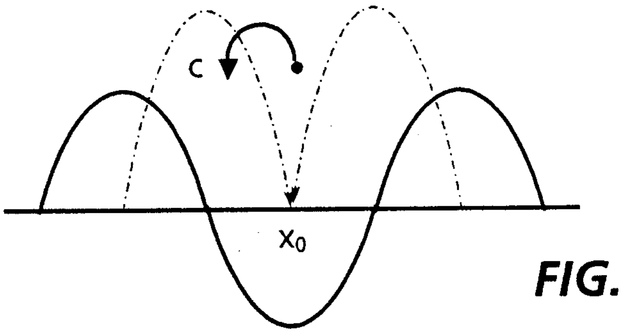
Figure 4D:
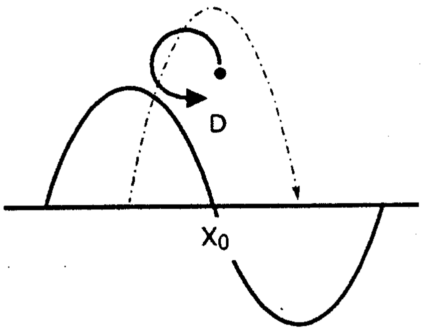
Figure 5A:
FIGS. 5*a* to 5*d* show the instantaneous motion of a charged particle of opposite sign to that of FIGS. 4*a* to 4*d* in the same field.
Figure 5B:
Figure 5C:
Figure 5D:

In FIG. **4*a* it can be seen that a positively charged particle 18 located at an initial position $x_0$ relative to the traveling electrostatic wave 20 will be driven by the field lines in the direction of arrow A. When the traveling electrostatic wave 20 has moved to the position shown in FIG. 4*b*, the field lines will drive the particle 18 in the direction of arrow B, moving the particle in a counterclockwise direction. Similarly, in FIG. 4*c* and 4*d* the charged particle will follow the field lines, resulting in the cyclical, generally circular motion indicated by arrows C and D. The motion of a negatively charged particle is shown in FIGS. 5*a* to 5*d***. It can be seen that although at any point in its trajectory it will move oppositely to the positively charged particle, nevertheless it also will follow a generally circular motion in the counterclockwise direction.

In addition to this cyclical, generally circular velocity there will be a net particle drift in the wave propagation direction. The instantaneous velocity of the charged particle above the electrostatic surface wave may be written in the form:

$$V_x=\mu E_x=\mu k\phi_0 e^{-ky}\sin(kx-\omega t) \quad (3a)$$

$$V_y=\mu E_y=\mu k\phi_0 e^{-ky}\cos(kx-\omega t) \quad (3b)$$

Here $\phi_0$ corresponds to the magnitude of the voltage at the dielectric surface associated with the electrostatic surface wave, k is the spatial frequency of the electrostatic wave as determined by the configuration of the transport electrodes (i.e. their width and spacing), and $\omega$ is the radial frequency of the wave.

It can be mathematically shown that if the ratio, Y, of the instantaneous speed of the charged particle, $\mu k\phi_0$, to the phase velocity of the surface wave, $\omega/k$, is less than 1/e, or about ⅓, then the particle will move with a net drift in the field of the electrostatic wave, with a drift velocity approximately equal to:

$$V_x^{drift} = \frac{\omega}{k}\left((y^2 + 3y^4 + O(y^6)\right) \quad (4)$$

This drift motion of the charged particle may be thought of as arising from two factors which I identify as the exponential decay factor and the plane wave factor. The exponential decay factor is generally described by the equations:

$$V_x = -\mu k \phi_0 e^{-ky} \sin \omega t \quad (5a)$$

$$V_y = \mu k \phi_0 e^{-ky} \cos \omega t \quad (5b)$$

Equations 5a and 5b represent the leading order of the expansion of equations 3a and 3b in powers of kx. It is well known that the electric field above an electrode (in the y-direction) decays exponentially with respect to the distance away from the electrode. Thus, a charged particle will move more rapidly at the bottom of its circular trajectory than at the top. Since its movement is in the positive x-direction at the bottom of its orbit, and in the negative x-direction at the top of its orbit (note FIGS. 4 and 5), over each cycle of the electrostatic wave, there is a net movement of the particle in the positive x-direction.

Figure 6:
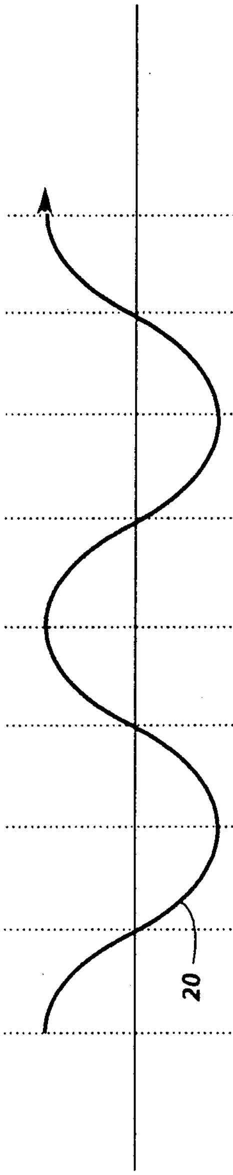
FIG. 6 shows a traveling electrostatic wave.
Figure 7:
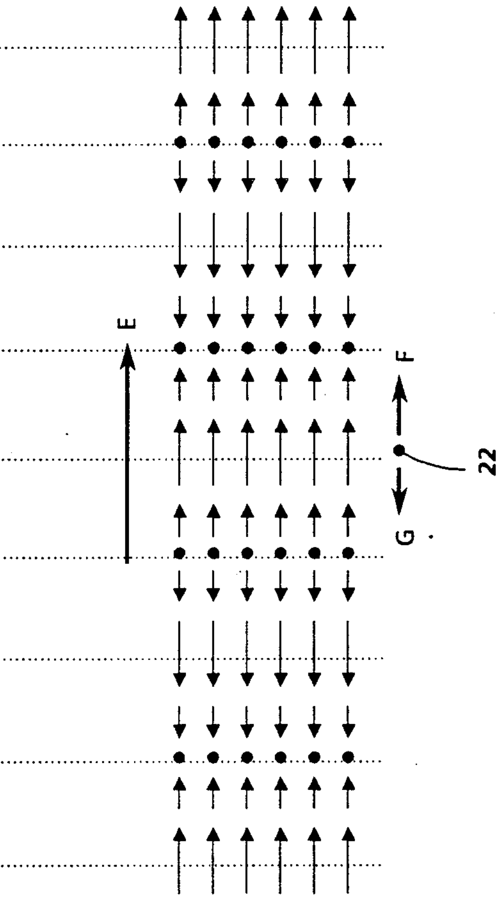
FIG. 7 is a graphical representation of the traveling electrostatic wave as a plane wave.

The electrostatic plane wave factor in the net particle drift will be understood with reference to FIGS. 6 and 7, considered together with the equations:

$$V_x = \mu k \phi_0 \sin (kx - \omega t) \quad (6a)$$

$$V_y = \mu k \phi_0 \cos (kx - \omega t) \quad (6b)$$

Equations (6a) and (6b) represent the leading order of the expansion of Equations (3a) and (3b), in powers of ky.

In FIG. 6, the electrostatic traveling wave is represented by a sine wave, whereas in FIG. 7, the electrostatic traveling wave is represented as a plane wave comprised of arrows indicating both the magnitude and sign of the potential at a given x-location. Both waves are shown traveling in the +x-direction by arrow E. A number of dotted lines extending between the two Figures show the correspondence between them, indicating that the right-facing arrows represent a positive electric field, in the x-direction, the left-facing arrows represent a negative electric field, and the dots indicate zero electric field, in the x-direction. It will be apparent that a charged particle 22 moving in the electrical field of this plane wave moves roughly half of the time in the direction of propagation of the wave (+x) and half of the time in the direction counter to the propagation of the wave (−x). Since the ion velocity is smaller than the speed of the wave it can be seen to primarily oscillate in the field about a given "home" position while the plane wave "runs through" and past the particle. However, over many cycles there can be seen to be a net drift, in the direction of wave propagation, along with the oscillation. This phenomenon exists because when the ion is moving in the +x-direction the wave appears to the ion to move more slowly than when the ion is moving in the −x-direction. Thus, due to this difference in relative velocity, over each single cycle of the plane wave, the ion spends somewhat more time moving with the wave than moving against it. Over time there is a net drift in the direction of propagation of the wave, as indicated by the arrows F and G showing particle movement, with arrow F being slightly longer than arrow G.

Figure 8:
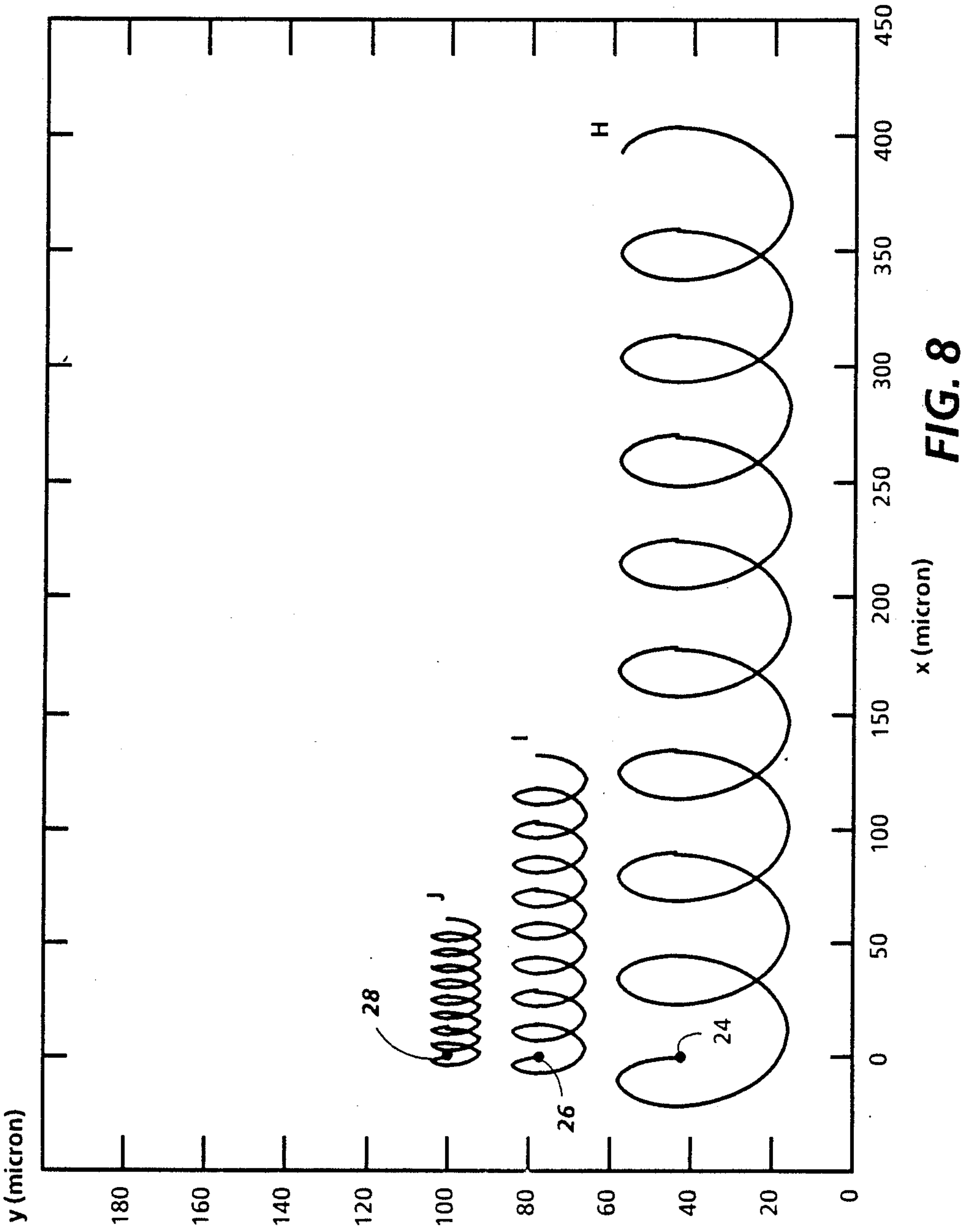
FIG. 8 is a graphical representation of the trajectories of three charged particles located at different heights above the surface of the transport electrodes.

Movement of the charged particle in the transport direction may be thought of as a sum of both factors, with each contributing approximately equally to the net drift. The total drift of the charged particles is then given by Equation (4). A graphical representation of stable particle drift is illustrated in FIG. 8. The particle 24 starting closest to the transport array surface (0 micron) at about 42 microns will have a higher drift velocity than particle 26, starting at about 73 microns, which, in turn, will have a higher drift velocity than particle 28, starting at about 100 microns above the transport array surface. It should be noted that the trajectories of these three particles as represented by curves H, I and J, respectively, are located entirely above the surface of the transport array.

In order for charged particle transport, according to my invention, to be stable, the ratio Y (instantaneous particle speed to velocity of moving wave) should be on the order of or less than 1/e, or about ⅓. Thus, in equation (4) terms proportional to $Y^4$ and above are extremely small and may be disregarded for the purpose of this explanation and, to a first order approximation, the drift velocity ($V_{x\text{-}drift}$) can be seen to be much smaller than the electrostatic wave velocity by a factor of approximately $Y^2$. If the particle speed is too high, the transport dynamics will be unstable, and the particles will be driven into the transport array surface. They then will not be constrained in the controlled trajectories of FIG. 8.

Since the instantaneous particle velocity is directly proportional to the electric field, as noted in Equations (1) and (2), an increase in the electric field can move the particle into the velocity regime where it will be unstable and uncontrollable, namely, where Y is greater than 1/e. However, because the electric field decays exponentially with its distance from the transport array surface there will be a stable regime at that distance above the array where Y is approximately equal to or less than 1/e. In order to keep the particle entrained in the velocity regime of stable motion the electric field strength E must be properly adjusted in accordance Equation (1).

Experimental results have shown ion drift speeds in air of about 100 m/sec in the vicinity of the substrate surface and a corona current of about 80 μA/cm. These results are based upon an array of electrodes patterned onto a dielectric surface with each electrode being about 50 microns wide and with a gap of 50 microns between electrodes. With this arrangement, a fundamental electrostatic wave is constructed, of wavelength about 400 microns. The electrodes were driven with a driving frequency of 2.0 MHz and a sinusoidal voltage swing of +250 V to −250 V with adjacent electrodes being 90° out of phase with their neighbors. The achieved results, which compare favorably with the typical corona current obtained from the fluid flow assisted marking head constructed in accordance with U.S. Pat. No. 4,644,373 discussed above and more particularly described with respect to FIG. 9.

Figure 9:
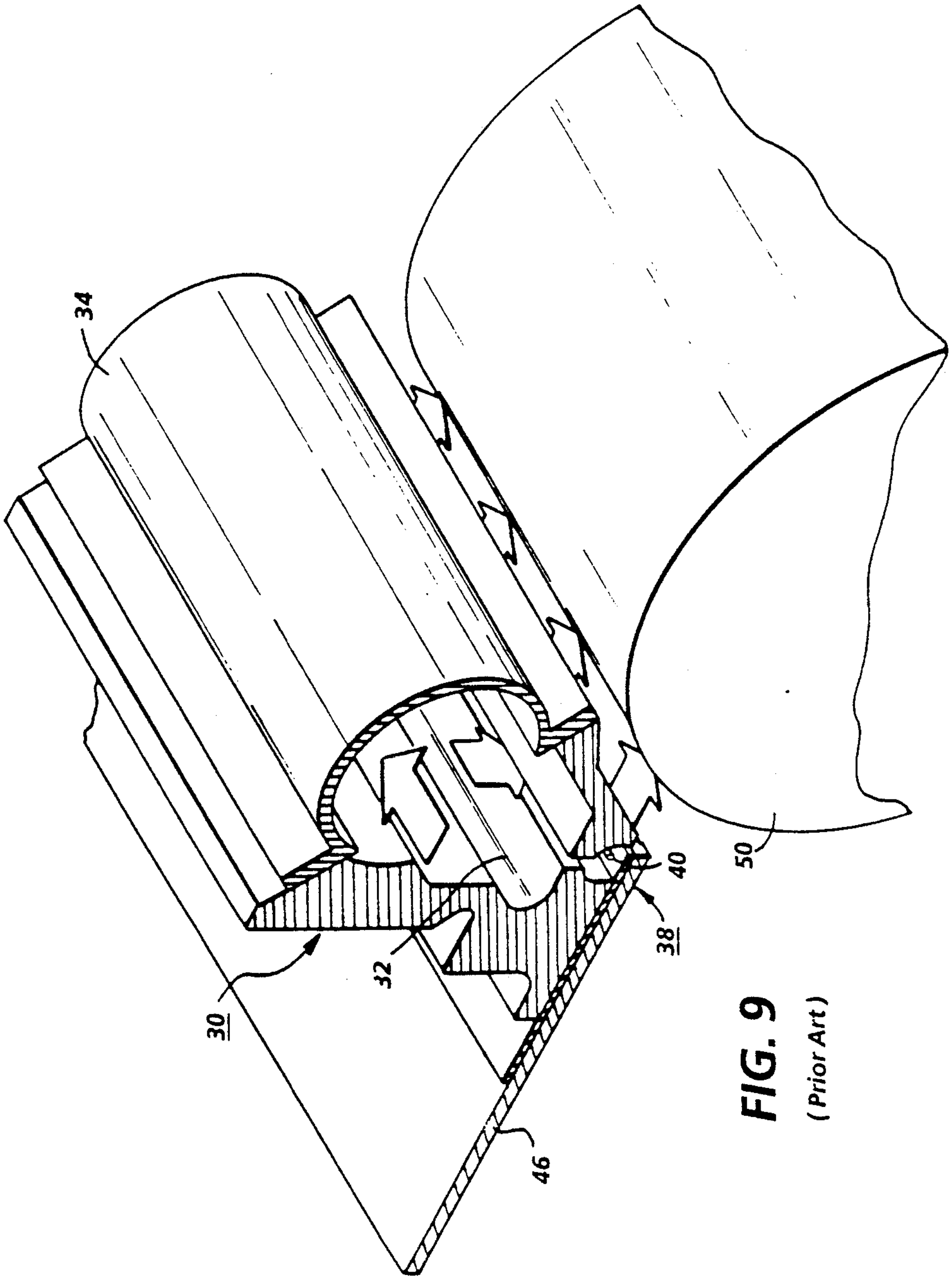
FIG. 9 (Prior Art)
FIG. 9 is a perspective view of a known fluid assisted ionographic marking apparatus.
Figure 10:
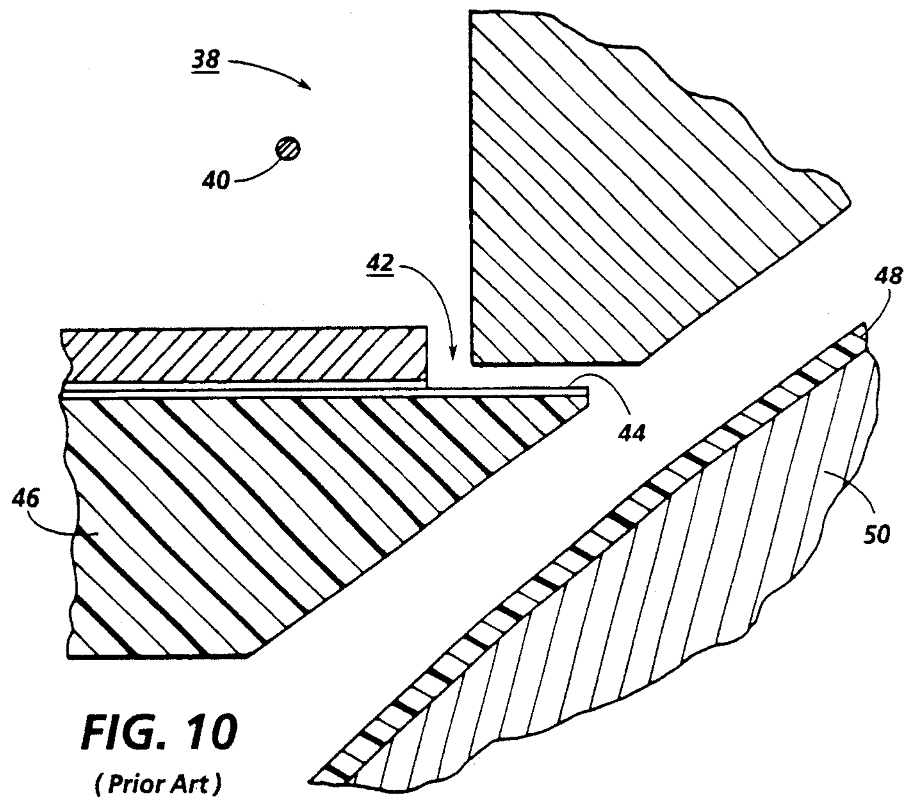
FIG. 10 (Prior Art)
FIG. 10 is an enlarged sectional view showing the ion generating region, the ion modulating region and the ion collecting region of the known ionographic marking apparatus shown in FIG. 9.

In FIG. 9 there is illustrated the known fluid flow assisted ion projection marking head 30 having an upper portion comprising a plenum chamber 32 to which is secured a fluid delivery casing 34. An entrance channel 36 receives the low pressure fluid (preferably air) from the plenum chamber and delivers it to the ion generation chamber 38 within which is a corona generating wire 40. The entrance channel has a large enough crosssectional area to insure that the pressure drop therethrough will be small. Air flow into and through the chamber 38 will entrain ions and move them through an exit channel 42, shown enlarged in FIG. 10. An array of modulating electrodes 44 extending in the direction of fluid flow is provided upon a dielectric substrate 46 for controlling the flow of ions passing out of the exit channel 42 and onto the charge receptor 48. A bias applied to a conductive backing 50 of the charge receptor serves to attract ions allowed to pass out of the marking head 30.

Figure 11:
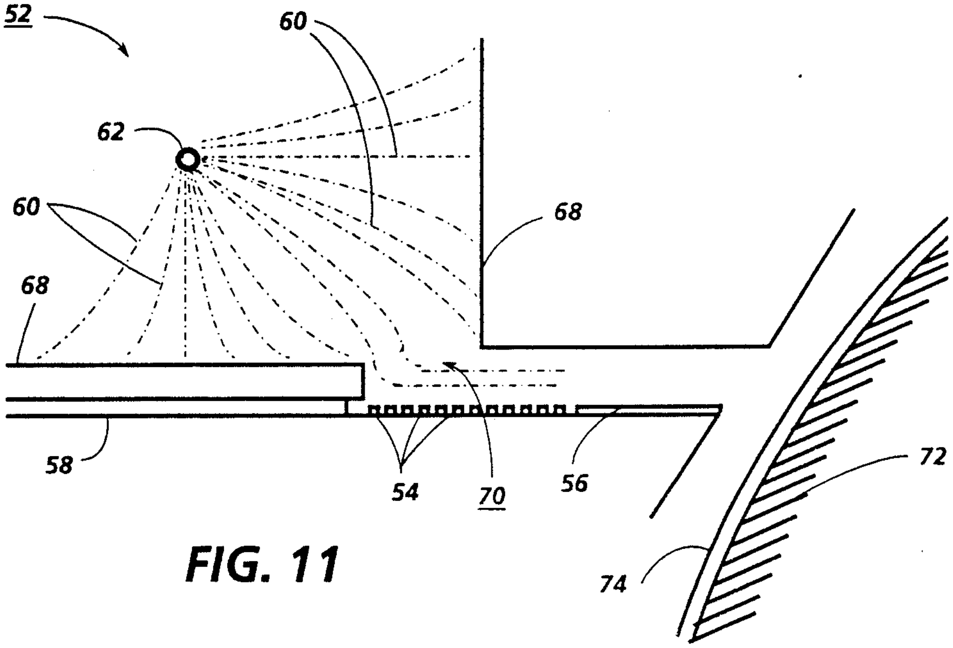
FIG. 11 is an enlarged sectional view similar to FIG. 10, modified to incorporate the ion transport array of the present invention.

In FIG. 11 there is shown the marking head of FIG. 9 as modified to incorporate the present invention. Although not illustrated, no provision is made for pumping air through this marking head 52. An array of transport electrodes 54 (as fully described above), in addition to the array of modulation electrodes 56, is formed upon the dielectric substrate 58. The ions move along field lines 60 from the corona wire 62 to the conductive walls 68 of the marking head. Those ions entering into the exit channel 70 will come under the influence of the transport electrodes 54 which serve to move the ions, suspended in the air, through the exit channel 70 in a stable and controlled manner above the surface of the dielectric substrate 58. Because this is a mobility constrained system, the ions will drift in the transport direction only as long as they are under the influence of the traveling electric field. Therefore, the transport electrode array 54 should extend into the exit channel 70 far enough to where an accelerating field from the conductive backing 72 extends into the exit channel to attract the ions to the charge receptor 74. In addition to the sinusoidal voltage applied to the transport electrodes, it is important to provide a path to ground for each electrode. This will effectively eliminate the possibility of problems arising if the transport surface builds up charge due to ion impingement on its surface.

Figure 12:
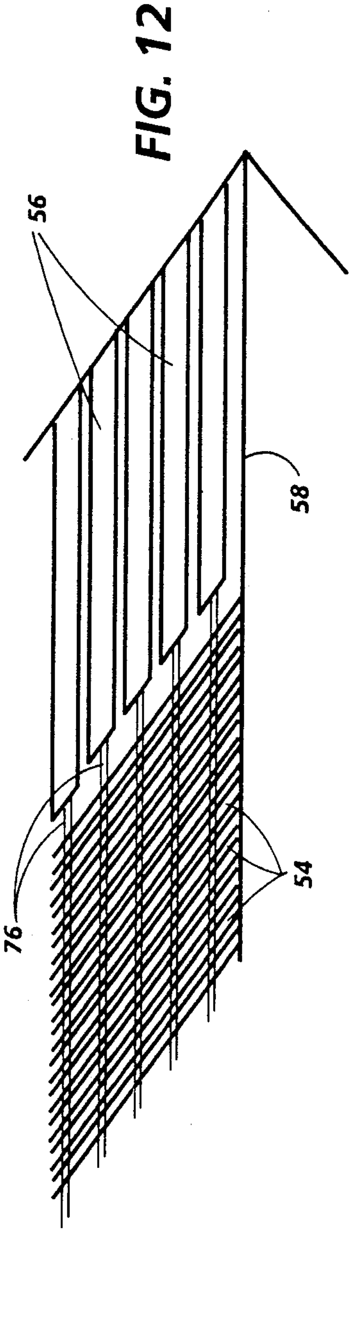
FIG. 12 is a perspective view of the ion transport and ion modulation arrays of FIG. 11.

The transport electrodes, shown clearly in FIG. 12, may be formed upon the dielectric substrate 58 in the same manner as are the modulation electrodes, and extend normal thereto. Since the conductive transport electrodes 54 overlie the conductive modulation electrodes 56, it is necessary to separate them with a suitable dielectric layer (not shown). Nevertheless, at each crossing the electric field lines will be contained completely within the dielectric layer and essentially no field lines, needed for transport, will exist above the array. One way to minimize this deleterious effect, is to reduce the width of the leads 76 to the modulation electrodes in this underlying region.

Figure 13:
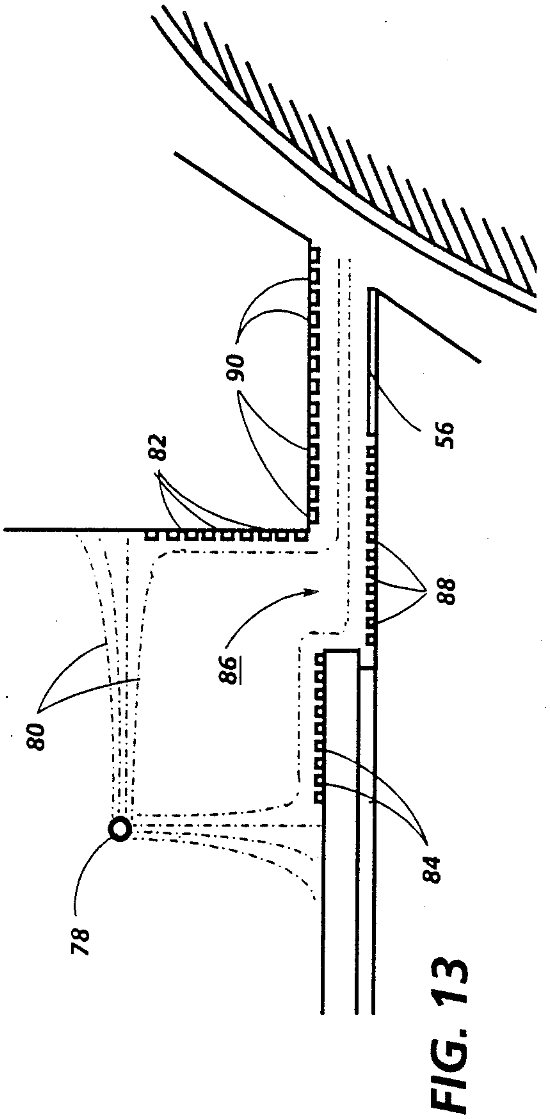
FIG. 13 is a view similar to FIG. 11 wherein ion entrainment arrays have been added.

In another embodiment, illustrated in FIG. 13, the ions emanating from the corona wire 78 and traveling along field lines 80 will come under the influence of the ion entrainment transport arrays 82 and 84. In this manner, it is possible to direct many more ions into the exit channel 86 where they will be transported by the transport array 88. In addition, electrodes 90 may be placed on the wall opposite the array of modulation electrodes 56, allowing transport of ions through the exit channel 86.

There are, of course, numerous applications for the charged particle transport system in addition to usage in a marking apparatus, such as the ionographic device described. It should be understood that the present disclosure has been made only by way of example and that numerous other changes in details of construction and the combination and arrangement of parts may be resorted to without departing from the true spirit and scope of the invention as hereinafter claimed.

What is claimed:

1. A method for transporting electrically charged particles suspended in a fluid, through said fluid, in a transport direction, comprising the steps of providing an array of electrically conductive transport electrodes disposed upon a dielectric surface adjacent said fluid, said array including a plurality of substantially parallel electrodes extending transversely to said transport direction, applying a sinusoidally varying electrical potential to each of said electrodes with each adjacent electrode being phase displaced from its neighboring electrodes, so as to create a traveling electrostatic wave propagating in said transport direction, controlling the electrical potential so as to move said charged particles through said fluid under the influence of said traveling electrostatic wave without contacting said transport electrodes or said dielectric surface.

2. The method for transporting electrically charged particles suspended in a fluid as defined in claim 1 including imparting to said charged particles a compound movement through said fluid comprising a generally cyclical motion and a drift motion in said transport direction.

3. The method for transporting electrically charged particles suspended in a fluid as defined in claim 1 including controlling the magnitude of said electrical potential and speed of travel of said traveling electrostatic wave so that said electrostatic wave velocity is least three times as fast as the instantaneous, generally cyclical velocity of said charged particles.

4. Apparatus for transporting electrically charged particles suspended in a fluid through said fluid in a transport direction, comprising an array of electrically conductive transport electrodes disposed upon a dielectric support adjacent said fluid, said array including a plurality of substantially parallel electrodes extending transversely to said transport direction, a source of A.C. voltage applied to each of said transport electrodes, the phases of neighboring electrodes being shifted with respect to each other so as to create a traveling electrostatic wave propagating in said transport direction, and means to control the electrical fields emanating from said transport electrodes so as to cause said charged particles to move in a path through said fluid above said electrically conductive transport electrodes and said dielectric support.

5. The apparatus for transporting electrically charged particles suspended in a fluid as defined in claim 4 wherein said means to control the electrical fields causes said charged particles to move through said fluid with a compound motion including a generally cyclical component and a drift component, said drift component being in said transport direction.

6. The apparatus for transporting electrically charged particles suspended in a fluid as defined in claim 4 wherein the magnitude of said electrical potential and the speed of travel of said traveling electrostatic wave are selected so that said electrostatic wave velocity is least three times as fast as the instantaneous generally cyclical velocity of said charged particles.

* * * * *